United States Patent [19]

Leiser et al.

[11] 4,148,962

[45] Apr. 10, 1979

[54] FIBROUS REFRACTORY COMPOSITE INSULATION

[76] Inventors: Robert A. Frosch, Administrator of the National Aeronautics and Space Administration, with respect to an invention of, Daniel B. Leiser, San Jose, Calif.; Howard E. Goldstein, Saratoga, Calif.; Marnell Smith, San Jose, Calif.

[21] Appl. No.: 940,688

[22] Filed: Sep. 8, 1978

[51] Int. Cl.² .................... C04B 35/80; C04B 35/14; C04B 35/18

[52] U.S. Cl. .................................................. 428/366

[58] Field of Search ................. 428/366, 374; 106/50, 106/65, 69, 44

[56] References Cited

U.S. PATENT DOCUMENTS

| | | | |
|---|---|---|---|
| 3,077,413 | 2/1963 | Campbell | 106/69 |
| 3,752,683 | 8/1973 | Hawthorne | 106/55 |
| 3,788,935 | 1/1974 | Shyne et al. | 428/366 |
| 3,935,060 | 1/1976 | Blome et al. | 106/65 |
| 4,041,199 | 8/1977 | Cartwright | 106/69 |

*Primary Examiner*—O. R. Vertiz
*Assistant Examiner*—Mark Bell
*Attorney, Agent, or Firm*—Armand McMillan; John R. Manning; Darrell G. Brekke

[57] ABSTRACT

A refractory composite insulating material prepared from silica fibers and aluminosilicate fibers in a weight ratio ranging from 1:19 to 19:1, and about 0.5 to 30% boron oxide, based on the total fiber weight. The aluminosilicate fiber and boron oxide requirements may be satisfied by using aluminoborosilicate fibers and, in such instances, additional free boron oxide may be incorporated in the mix up to the 30% limit. Small quanitites of refractory opacifiers, such as silicon carbide, may be also added. The composites just described are characterized by the absence of a nonfibrous matrix.

8 Claims, No Drawings

FIBROUS REFRACTORY COMPOSITE INSULATION

ORIGIN

The invention described herewith was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

High temperature insulating materials which are suitable, for example, as reusable reentry heat shield for orbiting vehicles.

2. Description of the Prior Art

The development of a reusable space vehicle has created a need for a reusable surface insulating material. The characteristics required by such a material include mechanical strength and high strain to failure, as well as resistance to devitrification or crystallization at high temperature which would render the insulation inferior for reuse.

Conventionally, the high temperature insulations of the art have been formed by bonding ceramic fibers with inorganic binders. Aluminosilicate and silica fibers have been taught as appropriate for use in such composites (U.S. Pat. Nos. 3,077,413 and 3,752,683). The fibers, however, are always interspersed in a matrix of binder, usually an inorganic oxide such as colloidal silica. The use of a binder matrix limits the potential of the individual fibers in the resultant insulation to a fraction of their possible strength or strain to failure. The present invention is unique in that it dispenses with the binder matrix which the prior art considers necessary; the present materials are composed of fibers only.

The production of an acceptable insulation composed of fibers alone is even more of a surprise to the art in light of the fibers which are used to produce this new invention, one of which being the highly sensitive, high purity silica fibers. Since small amounts of impurities, it has been taught, can cause undesirable divitrification in such fibers, it could reasonably have been inferred from these teachings that the other fiber ingredient of this invention, aluminoborosilicate fibers, would act as such an impurity and cause devitrification of the silica fibers. This has now been shown not to be the case.

SUMMARY OF THE INVENTION

It has now been discovered that refractory composite insulation can be produced from two fibers: aluminoborosilicate and silica fibers. This two-fiber composite has more desirable properties than the conventional rigid insulations containing fibers, because each fiber imparts to the composite its desirable characteristics unencumbered by the binders required by the prior art. This advance in the art has resulted from the discovery that boron oxide, present in aluminoborosilicate fibers or as a separate ingredient, serves to stabilize the sensitive, high purity silica fibers at high temperatures. In the present composites, the fiber components are used at weight ratios of 1:19 to 19:1, and boron oxide constitutes from 0.5 to 30% by weight of the total fiber weight.

DETAILED DESCRIPTION OF THE INVENTION

The fibrous refractory composite insulation of the present invention is composed of two different fibers. In one embodiment of the invention these fibers are aluminoborosilicate and silica. Each of these fibers serves an important function in producing the desirable characteristics of the resultant insulation. Silica fiber is highly reactive and when of high purity is resistant to the devitrification which would limit the long term high temperature life time of the resultant insulation. This fiber may be viewed as providing a matrix for the more refractory aluminoborosilicate fiber which cannot easily be made into a rigidized form by itself. The aluminoborosilicate fibers do not soften or sinter significantly at temperatures lower than 1370° C. and therefore provide a higher temperature capability than an all silica insulation would provide. The boron oxide ingredient of the aluminoborosilicate fiber is in fact a stabilizer which prevents devitrification of the sensitive silicate fibers upon firing during the production of the insulation.

The two-fiber composite provides low density insulation which exhibits thermal expansion and thermal conductivity properties comparable to those of prior art insulations, while possessing improved strength, strain to failure, and temperature capabilities.

The insulation of the present invention can be made with varying ratios of the weights of aluminoborosilicate and silica fibers. This ratio is controlled to maximize the desired characteristics of the composite while minimizing the undesirable characteristics. Thus, addition of aluminoborosilicate fibers yields a desired increase in the temperature capabilities of the resultant insulation. At the same time, however, undesirable increases in thermal conductivity and thermal expansion coefficient also occur. With these considerations in mind, the weight ratios of the fibers can be varied within the range of 1:19 to 19:1, with a most satisfactory balance of properties being achieved at ratios between about 1:9 and 2:3. Optimum insulation for the current purposes of the inventors has been obtained with a dry weight ratio of about 4:1 silica fibers to aluminoborosilicate fibers (containing about 14% boron oxide).

Suitable forms of raw materials are available commercially. Silica fibers, at least 99.6% pure, are manufactured by Johns Manville and marketed as Microquartz 108 fibers. These fibers have an average diameter of 1.7 microns. Aluminoborosilicate fibers produced by the 3-M Company and known as AB-312, contain 62%±2.0% $Al_2O_3$, 14+2.0% $B_2O_3$ and 24±2.0% $SiO_2$. They may be obtained in average diameters ranging from 3 to 12 microns. Acceptable insulation may be made from aluminoborosilicate fibers ranging in diameters from 3 to 12 microns and silica fibers ranging in diameter from 1 to 6 microns.

Boron oxide, it has been pointed out earlier, is the essential ingredient of the present composites which prevents the devitrification that silica fibers would be expected to undergo at high temperatures in the presence of "impurities" such as aluminosilicate fibers. The oxide is generally added in a quantity ranging from 0.5 to 30% of the total weight of fibers, with a range of 1 to 6% being preferred for reentry shield applications. It has been found further that the boron oxide can be added to aluminosilicate fibers, with or without prefiring before the silica fibers are added, or that the oxide can be added in the form of aluminoborosilicate fibers, i.e., already fully integrated within the structure of said fibers. When aluminoborosilicate fibers are used, additional free boron oxide may be added to the composite mix, due respect being accorded to the overall content limitations already recited.

The optical properties of composite insulating tiles made from the above materials may be modified by inclusion of a small quantity of finely divided, preferably less than 300 mesh, impregnant or opacifying substance. These materials, which must be refractory in nature, include various oxides, e.g., chromium and cobalt oxides, silicon carbide, and the like. While up to 3% of opacifier may be added to the composite mix, some of it is lost during processing by washing, so that the quantity that ultimately remains in the finished tile is substantially lower than what was originally added. This however is not a matter of importance.

The basic procedure that has been devised to prepare the composites of the invention may be described as follows. The high purity silica fibers are first washed and dispersed in hydrochloric acid and/or deionized water. The ratio of washing solution to fiber is between 30 to 150 parts liquid (pH 3 to 4) to 1 part fiber. Washing for 2 to 4 hours generally removes the surface chemical contamination and nonfibrous material (shot) which would contribute to silica fiber devitrification. After washing, the fibers are rinsed 3 times at approximately the same liquid to fiber ratio for 10 to 15 minutes with deionized water. The pH is then about 6. Excess water is drained off leaving a ratio of 5 to 10 parts water to 1 part fiber. During this wash and all following procedures, great care must be taken to avoid contaminating the silica fibers. The use of polyethylene or stainless steel utensils and deionized water aids in avoiding such contamination.

The washing procedure has little effect on the bulk chemical composition of the fiber. Its major function is the conditioning and dispersing of the silica fibers.

The aluminoborosilicate fibers are prepared by dispersing them in deionized water. They can be dispersed by mixing 10 to 40 parts water with 1 part fiber in a V-blender for 2½ to 5 minutes. The time required is a function of the fiber length and diameter. In general, the larger the fiber, the more time required.

The dispersed silica fibers and dispersed aluminoborosilicate fibers are then combined. The pH which is probably acidic is adjusted to basic with ammonium hydroxide. The slurry is then mixed. A slurry containing 12 to 25 parts water to 1 part fiber is mixed to a uniform consistency in a V-blender in 5 to 20 minutes. The preferred mixing procedure uses 15 parts water to 1 part fiber in the slurry producing an acceptable mixture in about 20 minutes.

The slurry is poured into a mold for pressing into the desired shape. The water is withdrawn rapidly and the resulting felt is compressed at 10 to 20 psi. Rapid removal of the water is required to prevent the fibers from separating. If graded properties are desired in the resultant material, the slurry can be allowed to settle and the fibers to partially separate before the removal of the water.

The final density of the finished tile is determined in part by the amount of compression placed on the felt, varying the wet molded dimension in relation to the fiber content. The insulation of the present invention has been prepared in densities ranging from about 0.08 to 0.48 g/cc. It can, however, be prepared in higher densities.

After molding, the insulation tile is dried and fired by the following preferred procedure. The tile is first dried in an oven for 18 hours; the temperature, initially 38° C., is raised at a rate of 11° C. per hour to 104° C., held there for 4 hours, raised again at a rate of 11° C. per hour to 150° C., and held there for 4 hours. The tile is taken directly from the drying oven, placed in the firing furnace, and fired. A temperature rise rate of 220° C. per hour or less is required in order to avoid cracking and warping in the case of a 15 cm × 15 cm × 7.5 cm tile. For larger tiles, slower heating rates may be required. The maximum firing temperature may vary from 1260° C. to 1370° C. depending upon the fiber ratio used and the final density of the insulation that is desired.

The temperature rise rate is chosen to permit relatively uniform temperatures to be achieved throughout the tile during the process. A faster temperature rise rate causes nonuniform strength and density and could cause cracking. Longer or higher temperature firing results in higher shrinkage and related greater resistance to subsequent shrinkage, as well as a shorter lifetime to devitrification. The maximum firing temperature is dependent upon the fiber ratio used and the density of the composite desired. The firing time and maximum temperature are selected to allow sufficient shrinkage to achieve stabilization while not allowing any devitrification.

After firing, the tiles are machined to obtain the desired final dimensions. Only about 0.5 cm of the material must be machined off.

The procedure used to prepare fibrous refractory composite insulation may be varied through a rather broad range with satisfactory results. In one variation, the silica or aluminoborosilicate fibers may be borated and prefired prior to use. This process is used to improve the morphological stability and physical properties of the resultant insulation.

The following examples are provided to illustrate the invention by describing various embodiments, including its best mode as presently conceived. All proportions used are expressed on a weight basis unless otherwise noted.

EXAMPLE 1

A tile having a density of 0.32 g/cc, and opacified with silicon carbide was produced according to the present invention, with 825 grams of silica fibers, 175 grams aluminoborosilicate fiber (average diameter - 11 μm length - 0.32 cm), 35 grams 1200 grit silicon carbide, 10 milliliters hydrochloric acid, 5 milliliters ammonium hydroxide and deionized water. The aluminoborosilicate fibers contained about 14% boron oxide.

The silica fibers were washed as in Example 2.

The aluminoborosilicate fibers were placed in a 7,570 ml capacity stainless steel double shell blender with 5,000 grams deionized water and mixed using the intensifier bar for 2½ minutes to disperse the fiber.

The washed silica fibers, dispersed aluminoborosilicate fibers, and silicon carbide were placed in a 28.31 liter stainless steel double shell V-blender. Deionized water was added to bring the total weight to 15,000 grams. The ammonium hydroxide (5 ml) was added to adjust the slurry to basic before mixing. The slurry was mixed, degassed, transferred to a mold and pressed into a billet as in Example 2.

The billet was dried and fired as in Example 2, and then machined to 17 cm×17 cm×7.5 in accordance with normal machining practices.

A comparison of the crucial properties of the resultant tile was a silica fiber—colloidal silica matrix composite of the art made substantially according to Example III of the U.S. Pat. No. 3,952,083 to a density of 0.32 g/cc, yielded the following data:

| Tile: | Present Invention | Prior Art |
| --- | --- | --- |
| Strain to failure | 0.5% | 0.2–0.3% |
| Modulus of rupture | 6.04 × 10$^6$ N/M | 1.67 × 10$^6$ N/M |
| Temperature capability | 1540° C. | 1480° C. |

EXAMPLE 2

In contrast to the tile of Example 1, another tile was prepared from the following ingredients and in the manner described below, which as shall be demonstrated is unsuitable for the purpose intended. The principal difference between the tile of this example and that of Example 1 is that no boron oxide was used here, either as part of the aluminosilicate fibers or in addition to said fibers.

The materials used were the following: 150 grams aluminosilicate fibers (AS-32, manufactured by 3-M Company containing 80% Al$_2$O$_3$ and 20% SiO$_2$), 1000 grams of silica fibers (Microquartz 108), 35 grams of 1200 grit silicon carbide, 10 ml of hydrochloric acid, 5 ml of ammonium hydroxide, and deionized water.

The silica fibers were placed in a polyethylene container in 32 liters of deionized water. Hydrochloric acid (10 ml) was added to bring the pH to 3. Pure nitrogen was bubbled through the mixture to agitate the fiber and assist washing. Agitation was continued for two hours. The acidic water was then drained off, fresh deionized water added and the mixture again agitated with pure nitrogen for 15 minutes. The rinsing process was repeated 2 more times which brought the pH to about 6.0.

The aluminosilicate fibers were placed in a 7,570 ml capacity stainless steel double shell blender with 5,000 grams of deionized water and mixed using the intensifier bar for 2½ minutes to disperse the fiber.

The washed silica fibers, dispersed aluminosilicate fibers, and silicon carbide were placed in a 28.31 liter stainless steel double shell V-blender. Deionized water was added to bring the total weight to 18,000 grams. Ammonium hydroxide (5 ml) was added to adjust the slurry to basic before mixing. The slurry was then mixed with the intensifier bar running for 20 minutes, removed from the V-blender and degassed, transferred into a mold, and pressed into a 21.6 cm×21.6 cm×10 cm billet. The top and bottom of the mold were perforated and covered with a 16 mesh aluminum screen to allow the excess water to flow out.

The billet was dried in an oven for 18 hours beginning at 38° C., increased at 11° C. per hour to 104° C., held for four hours at 104° C., increased at 11° C. per hour to 150° C. and held four hours at 150° C. After drying the billet was transferred to the firing furnace. The furnace temperature was increased at a rate of 220° C. per hour to the firing temperature, 1315° C., where it was held for 1½ hours. After firing the temperature was decreased at a rate of 220° C. per hour to 980° C. where the furnace was turned off, then allowed to cool to room temperature. The fired tile showed cracks on one side and a 2% devitrification. After subsequent treatment at 1370° C. for 4 hours the tile had devitrified 87%.

EXAMPLE 3

The usefulness of boron oxide in the two-fiber composites of this invention can be further demonstrated by the following preparations.

In one run, an experimental mixture was made containing 25% aluminosilicate fibers (Fiberfrax H, manufactured by the Carborundum Company, containing 62% Al$_2$O$_3$ and 38% SiO$_2$) and 75% pure silica fibers (Microquartz 108). The mixture was ground with mortar and pestle and then fired at 1400° C. for 5 hours. The resulting product underwent 48% devitrification. When the aluminosilicate fibers were prefired with boron oxide (85% and 15% respectively) at 1100° C. for 90 minutes and then mixed with the silica fibers and fired as above, the product exhibited no devitrification.

EXAMPLE 4

An acceptable 17 cm×17 cm×7.5 cm tile having a density of 0.11 g/cc was produced using 600 grams of silica fibers, 90 grams of aluminoborosilicate fibers (average diameter—11 μm, 0.64 cm long), 10 ml of hydrochloric acid, 5 ml of ammonium hydroxide, and deionized water.

The silica fibers were washed in accordance with the procedure of Example 2. The aluminoborosilicate fibers were dispersed in a 7,570 ml V-blender with 3000 grams of deionized water for 5 minutes. The washed silica fibers, dispersed aluminoborosilicate fibers, and ammonium hydroxide were mixed, with enough deionized water to bring the total weight to 9,000 grams, in a 28.31 liter V-blender for 10 minutes with the intensifier bar running. The slurry was removed from the V-blender, degassed, molded and the resulting billet dried as in Example 2. The billet was then transferred to the firing furnace. The furnace temperature was increased at a rate of 220° C. per hour to the firing temperature, 1260° C., where it was held for 5 hours. After firing, the temperature was decreased at a rate of 220° C. per hour to 980° C., at which point the furnace was turned off and allowed to cool to room temperature. The billet was machined to 17 cm×17 cm×7.5 in accordance with usual machining practices.

EXAMPLE 5

An acceptable 17 cm×17 cm×7.5 cm tile with yet greater stability toward devitrification than the tile of Example 1, having a density of 0.32 g/cc, and opacified with silicon carbide was produced using 825 grams of silica fibers, 175 grams aluminoborosilicate fibers (average diameter—11 μm, 0.64 cm long), 35 grams of 1200 grit silicon carbide, 10 ml of hydrochloric acid, 5 ml of ammonium hydroxide, 56.8 grams of boron oxide, and deionized water.

The silica fibers were washed in accordance with the procedure of Example 2. The boron oxide was dissolved in 4,000 grams of deionized water (concentration—1.42% boron oxide). The aluminoborosilicate fibers were placed in a stainless steel basket and dipped into the boron oxide solution (the aluminoborosilicate fibers absorbed 7 times their own weight of the boron oxide solution). The fibers with absorbed boron oxide were then dried at 104° C. for 4 hours and calcined at 1100° C. for 1 hour. The "borated" fibers were then placed in a 7,570 ml capacity stainless steel V-blender with 5,000 grams of deionized water and mixed using the intensifier bar for 2½ minutes to disperse the fiber. The washed silica fibers, dispersed "borated" aluminoborosilicate fibers, silicon carbide, and ammonium hydroxide were mixed with enough deionized water to bring the total weight to 15,000 grams, in a one cubic foot V-blender for 20 minutes with the intensifier bar running. The slurry was removed from the V-blender, degassed, molded, dried, fired, and machined as in Example 1.

EXAMPLE 6

An acceptable 17 cm×17 cm×7.5 tile with graded properties, having a density of 0.32 g/cc, and opacified with silicon carbide, was produced using 825 grams of silica fibers, 175 grams of aluminoborosilicate fibers (average diameter—11 μm, 0.64 cm long), 35 grams of 1200 grit silicon carbide, 10 ml of hydrochloric acid, 5 ml of ammonium hydroxide, and deionized water.

The silica fibers were washed in accordance with the procedure of Example 2. The aluminoborosilicate fibers were dispersed in a 7,570 ml V-blender with 5000 grams of deionized water for 5 minutes. The washed silica fibers, dispersed aluminoborosilicate fibers, silicon carbide and ammonium hydroxide were mixed with enough deionized water to bring the total weight to 25,000 grams, in a 28.31 liter V-blender for 15 minutes with the intensifier bar running. The slurry was removed from the V-blender, degassed, molded, dried, fired and machined in accordance with the procedure of Example 1.

The resulting tile is relatively richer in silica at the top and aluminoborosilicate at the bottom.

EXAMPLE 7

A 17.5 cm×17.5 cm×9 cm tile with a temperature capability greater than that of the tile of Example 1, having a density of 0.24 g/cc, and opacified with silicon carbide, was produced using 750 grams of aluminoborosilicate fibers (diameter—1 to 3 μm), 250 grams of silica fibers, 35 grams of silicon carbide, 5 ml of ammonium hydroxide, and deionized water. The silica fibers were dispersed in a 7,570 ml V-blender with 5,000 grams of deionized water for 5 minutes.

The dispersed silica fibers, aluminoborosilicate fibers, silicon carbide, and ammonium hydroxide were mixed with enough deionized water to bring the total weight to 18,000 grams, in a 28.31 liters V-blender for 7 minutes with the intensifier bar running. The slurry was removed from the V-blender, degassed, molded, and dried as in Example 2. In the furnace, the temperature was increased at a rate of 220° C. per hour to the firing temperature, 1370° C. where it was held for 1½ hours. After firing, the temperature was decreased at a rate of 220° C. per hour to 980° C., at which point the furnace was turned off and allowed to cool to room temperature. The billet was machined to 17.5 cm×17.5 cm×9 cm in accordance with the usual machining practices.

Although the products of this invention have been prepared in a manner which renders them particularly useful for space vehicle heat shields, it should be understood that materials of this type may be used in any high temperature insulation application for which their particular combination of properties qualify them. It should also be understood that many variations in composition and process can be carried out by the man skilled in the art without departing from the spirit and the scope of the invention as stated by the following claims.

What is claimed is:

1. A refractory composite consisting essentially of aluminosilicate fibers and silica fibers in a weight ratio within the range of about 19:1 to 1:19, and about 0.5 to 30% boron oxide, based on the total weight of the fibers.

2. The refractory composite of claim 1 wherein the fibers range in diameter from about 1 to about 15 microns.

3. The refractory composite of claim 1 wherein the boron oxide and aluminosilicate fibers are present in the form of aluminoborosilicate fibers.

4. The refractory composite of claim 3 also comprising boron oxide, in addition to that present in the fibers.

5. The refractory composite of claim 3 wherein the aluminoborosilicate fibers range in diameter from about 3 to 12 microns and the silica fibers range in diameter from about 1 to about 6 microns.

6. The refractory composite of claim 1 also comprising a refractory opacifying material.

7. The refractory composite of claim 1 wherein the aluminosilicate fiber to silica fiber ratio ranges from 1:9 to 2:3 and the boron oxide content is about 1 to 6% of the fiber weight.

8. A refractory composite prepared from aluminoborosilicate fibers containing about 14% boron oxide and pure silica fibers in a weight ratio of about 4:1 and about 3.5% silicon carbide, based on weight of the fibers.

* * * * *